Dec. 16, 1930.  A. J. JESSWEIN  1,784,875
ROCKING HORSE
Filed Aug. 3, 1928
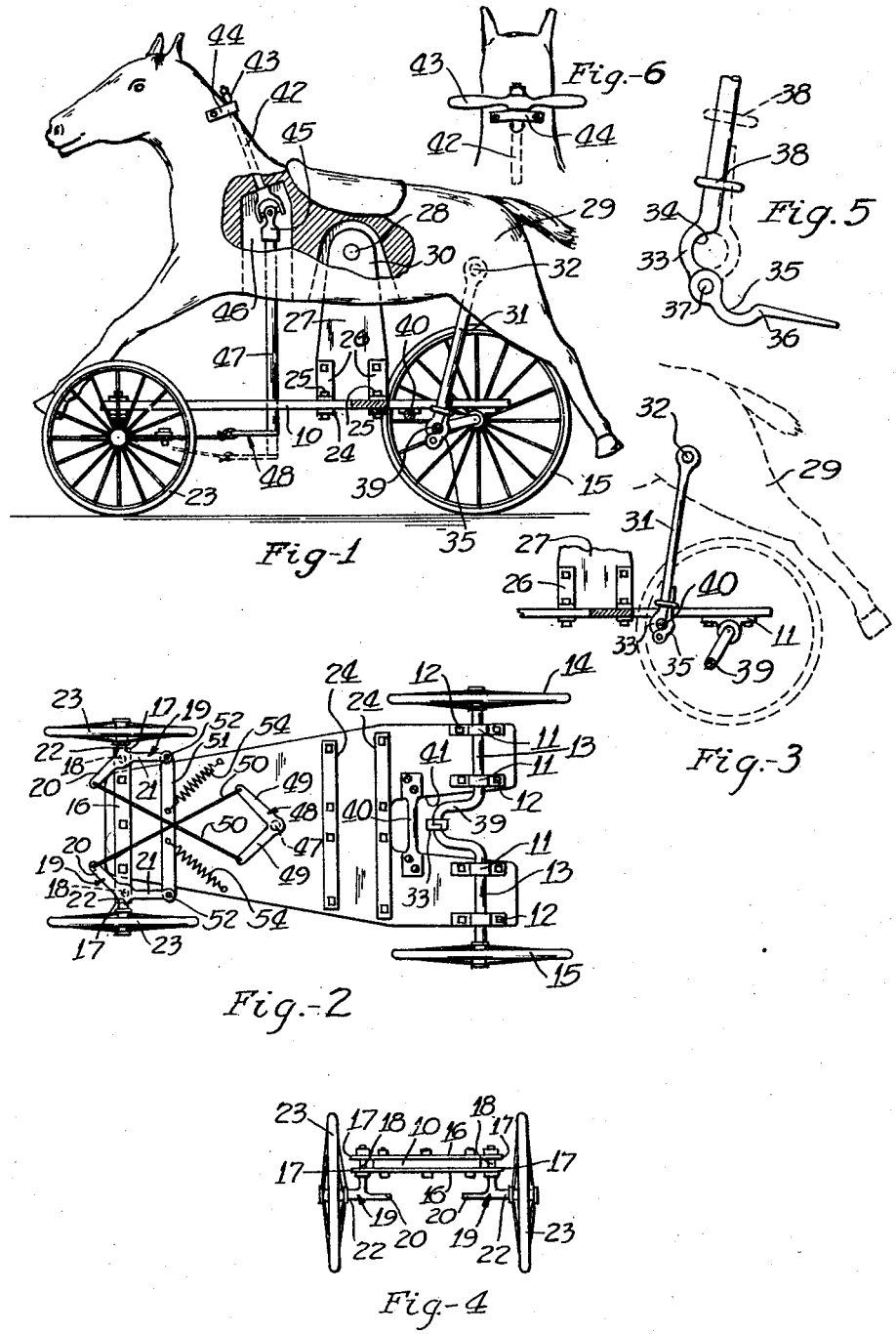
Inventor
Adolph J. Jesswein
By Harry C. Alberts
Attorney Patented Dec. 16, 1930

1,784,875

UNITED STATES PATENT OFFICE

ADOLPH J. JESSWEIN, OF KENOSHA, WISCONSIN

ROCKING-HORSE

Application filed August 3, 1928. Serial No. 297,137.

This invention relates to amusement devices and more particularly to manually propelled vehicles, although certain features thereof may be employed with equal advantages for other purposes.

It contemplates more especially the provision of improved, more effective, and less intricate means for imparting movement to a vehicle responsive to body oscillations of the rider.

Known devices of the character described are intricate, impossible of manipulation with ease, and possess mechanical defects which render it necessary to expend considerable effort in the operation thereof.

Then, too, it is exceedingly important that the steering mechanism therefor be independently operable irrespective of body position, and such be normally effective to retain the vehicle in a linear path. Where the rider is unable to propel the vehicle owing to physical conditions, or it is desired to leisurely coast therewith, means have been evolved to selectively render the rocking movement inoperative with respect to the vehicle frame.

One object of the present invention is to simplify the construction and improve the operation of devices of the character mentioned.

Another object is to provide simplified and more effective means for imparting linear movement to a vehicle responsive to the application of oscillations to a component element thereof.

A further object is the provision of means for rendering an oscillatory member inoperative for imparting linear movement to its wheeled supporting frame.

A still further object is to provide a novel and improved steering mechanism for an amusement vehicle.

Still a further object is to provide an improved steering mechanism for a manually propelled vehicle.

Other objects and advantages will appear from the following description of an illustrative embodiment of the present invention.

In the drawing:

Figure 1 is a fragmentary sectional view of a device embodying features of the present invention.

Figure 2 is a bottom view of the vehicle frame disclosed in Figure 1.

Figure 3 is a partial detail in elevation of means for rendering the vehicle propelling device inoperative.

Figure 4 is a front view of the steering wheels of the wheeled frame.

Figure 5 is an enlarged detail view of means for detaching the propelling connecting rod.

Figure 6 is a detail of the steering handle shown in Figure 1.

The structure selected for illustration comprises a wheeled frame 10 of any suitable construction and configuration having bearing straps 11 secured to the underside thereof by fasteners 12. These straps are positioned in alignment near the rear end of the frame 10 to receive a shaft 13 therethrough which is journalled therein to support wheels 14 and 15 thereon, the wheel 14 being preferably secured to the shaft 13 to rotate therewith for motivating the vehicle frame 10.

Confronting metallic straps 16 are secured to the frame 10 near the forward end thereof for extension therefrom on both sides thereof, these extensions 17 being bored to receive pintles 18. The pintles 18 are, in this instance, formed integral with bell crank levers 19 which have angular related arms 20 and 21 together with a stud shaft 22 arranged in a horizontal plane to carry forward wheels 23 journalled thereon.

The frame 10 carries intermediate transverse reinforcing straps 24 on the underside thereof, there being brackets 25 secured on the obverse side confronting said straps to define a support for upstanding bracket arms 26. A flat elongated member 27 is arranged longitudinally of said frame 10 and is secured to the bracket arms 26, it having an aperture in the free extremity thereof to receive a pintle pin 28. Any suitable body 29 preferably simulating an animate being such as a horse to constitute a seat member, is longitudinally grooved as at 30 to receive the member 27 for pivoted support on the pintle pin 28 which projects through the body 29, thereby enabling oscillatory movement of the horse body 29 with respect to the wheeled frame 10.

In order to propel the frame 10 in a linear path responsive to the oscillation of the body 29, a connecting rod 31 is interiorly pivoted to the body 29 on a pin 32 disposed rearwardly of its pivot support 28 for a substantial distance to provide an appreciable leverage arm. The other extremity of the connecting rod 31 terminates in an arcuate arm 33 presenting a semicircular surface 34 which complements a similar surface 35 formed on a lever 36 pivoted to the arm 33 as at 37, there being a strap 38 slidable on the connecting rod 31 to engage the free extremity of the lever 36. A crank arm 39 is formed on the driving shaft 13 for connection to the connecting rod extremity 33 intermediate the split surfaces 34 and 35 held in complemental relation by the strap 38. As a consequence, oscillatory movement of the body 29 will impart linear movement of the wheeled frame 10, so that the rider seated on the body 29 will be enabled to create an effect of animation thereto.

In the event the rider desires to rest or leisurely coast down an incline on the horse body 29 without oscillatory effect, the connecting rod is disconnected from the crank arm 39 by manipulating the strap 38. It is then connected to a rod 40 secured to the frame 10 to bridge a slot 41 provided in the frame for accommodating the crank arm 39, thereby maintaining the horse body 29 erect and rigid with reference to the frame 10. This feature increases the field of usefulness of the device, and materially adds to the pleasure obtainable therefrom.

The wheeled frame 10 is capable of being steered during the traverse thereof, and to this end a rod 42 is projected through the body 29 near the forward end thereof so that a manipulating lever 43 secured to the end thereof will be available and within convenient reach of the rider positioned on the body 29. A strap 44 is secured to the body 29, in this instance in the vicinity of the horse's neck to support and enable rotation of the rod 42 which terminates in a universal joint 45 positioned within an opening 46 provided in the body 29. A vertical rod 47 is operatively connected to the steering rod 42 through the joint 45, it loosely projecting through the frame 10 to receive a bi-armed lever 48. The arms 49 of the lever 48 are divergent in opposed parallelism to the arms 20 of the bell crank levers 19 for inter-connection through wires 50, so that the wheels 23 may be turned in any direction to steer the vehicle frame 10 by manipulating the hand lever 43.

The front wheels turn in unison owing to a rod 51 which is pivoted at the extremities 52 thereof to the lever arms 21, thereby insuring easy steering during the oscillation of the horse body 29 created by the rider whose feet rest on the frame 10 for coordination with the hands which grip the steering lever 43 to impart forward movement to the vehicle frame 10. Springs 54 are secured to the rod 51 in divergent relation for anchorage to the frame 10, thereby normally directing the wheels 23 forward in parallelism to the wheels 15 for ordinarily directing the frame 10 in a straight path. It is to be noted that part driving means may be connected with the forward wheels in much the same way as described in connection with the present arrangement, so that the descent of both ends will create forward propulsion, thereby increasing the mechanical advantage of the driver.

Various changes may be made in the embodiment of the invention herein specifically described without departing from or sacrificing any advantages thereof as defined in the appending claims.

I claim:

1. The combination with a wheeled frame, of a seat member pivotally associated with said frame intermediate the extremities thereof, a crank shaft constituting a wheel support for said frame, a connecting rod secured to said seat member rearwardly of its pivotal support, an operative connection between said connecting rod and crank shaft to impart movement to said frame responsive to the oscillation of said seat member, steering means for said wheeled frame, pivotal levers connected to said steering means, a bar between said levers to insure corresponding steering movement therein, and resilient means anchored to said bar for operative connection with said steering means to normally guide said wheeled frame in a rectilinear path.

2. The combination with a wheeled frame, of a seat member pivotally associated with said frame, connecting means between said seat member and wheeled frame to impart linear movement thereto responsive to the oscillation of said seat member, means for disconnecting the driving connection between seat member and said wheeled frame to enable the traverse thereof without oscillation of said seat member, and means selectively operable for holding said seat member against oscillation.

3. The combination with a wheeled frame, of a seat member pivotally associated with said frame, connecting means between said seat member and wheeled frame to impart linear movement thereto responsive to the oscillation of said seat member, means for disconnecting the driving connection between seat member and said wheeled frame, and means for rendering said seat member rigid in said disconnected driving relation.

4. The combination with a wheeled frame, of a seat member pivotally associated with said frame, connecting means between said seat member and wheeled frame to impart linear movement thereto responsive to the oscillation of said seat member means for disconnecting the driving connection between seat member and said wheeled frame, and a rod for enabling the securing of said connecting means when disconnected from driving relation with said frame to simultaneously render said seat member stationary relative to said frame.

5. The combination with a wheeled frame, of a seat member pivotally associated with said frame intermediate the extremities thereof, a crank shaft constituting a wheel support for said frame, a connecting rod secured to said seat member rearwardly of its pivotal support, an operative connection between said connecting rod and crank shaft to impart movement to said frame responsive to the oscillation of said seat member, and a rod fixed to said frame to receive said connecting rod when disconnected from said crank shaft to render said seat member stationary relative to said frame.

ADOLPH J. JESSWEIN.